United States Patent Office 3,798,238
Patented Mar. 19, 1974

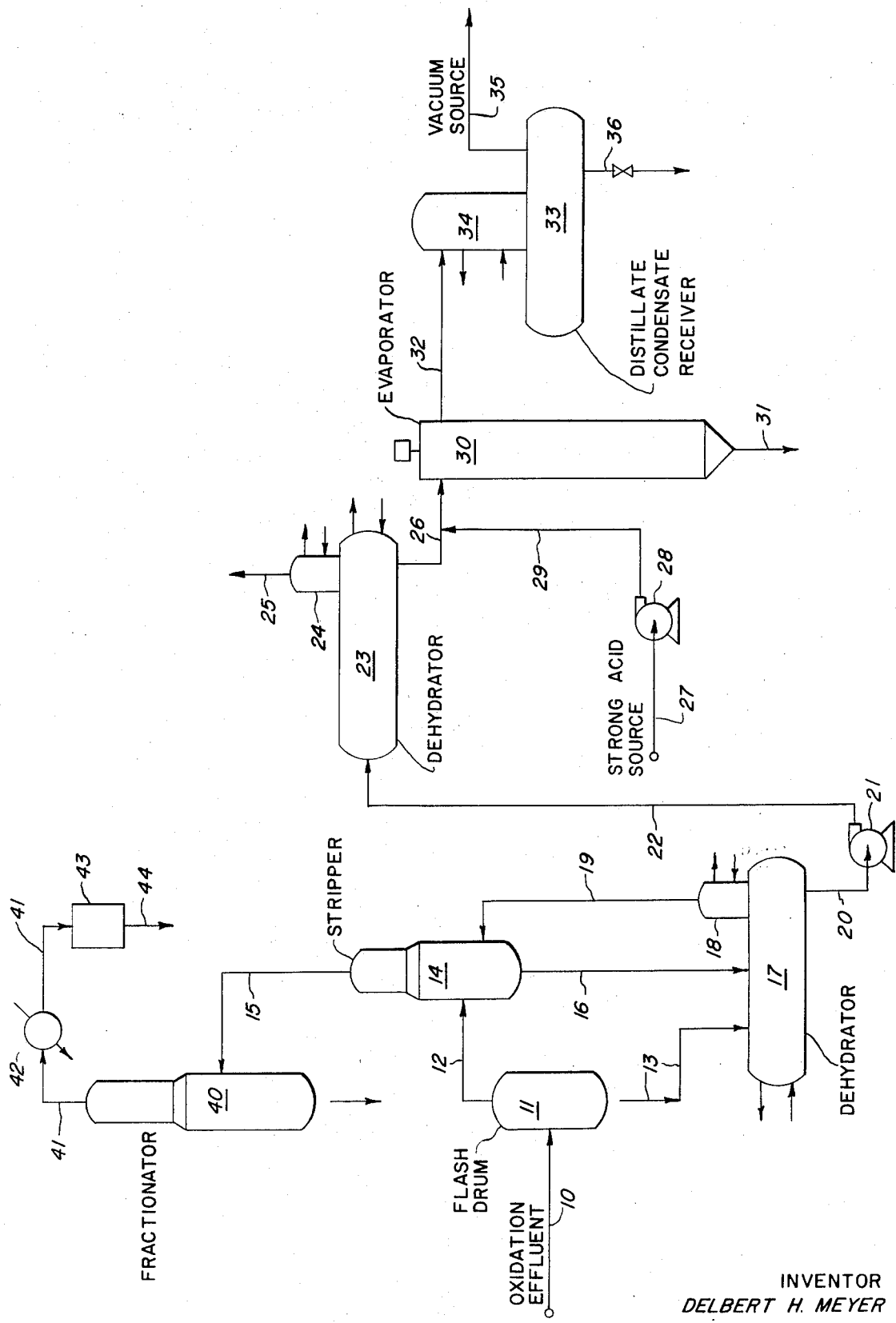

3,798,238
TRIMELLITIC ACID ANHYDRIDE PRODUCT RECOVERY FROM PSEUDOCUMENE OXIDATION EFFLUENT
Delbert H. Meyer, Naperville, Ill., assignor to Standard Oil Company, Chicago, Ill.
Filed Feb. 24, 1971, Ser. No. 118,292
Int. Cl. C07c 63/02, 63/32
U.S. Cl. 260—346.4      4 Claims

ABSTRACT OF THE DISCLOSURE

Fluid effluent from pseudocumene oxidation under liquid phase conditions or concentrate thereof is subjected to simultaneous stripping of reaction medium and thermal conversion of its trimellitic acid content to crude trimellitic acid anhydride followed by vacuum flash distillation or evaporation of the acid anhydride from a mixture of such crude acid anhydride and a small arount of strong mineral acid to recover product acid anhydride. Such acid anhydride recovery avoids subjecting said fluid oxidation effluent to crystallization for trimellitic acid recovery which leaves 30 to 40 percent of the oxidation product tricarboxylic acid dissolved in the reaction medium mother liquor requiring further processing to obtain such solute for conversion into the desired acid anhydride product.

BACKGROUND OF THE INVENTION

Trimellitic acid is used as its acid anhydride (intramolecular acid anhydride, 4-carboxyphthalic anhydride, hereafter referred to as "TMA") for the commercial preparation of esters, alkyd resins and urethane-like foams or as an intermediate for the 4-acid halide from which poly(amide-imide) resin can be readily made. Trimellitic acid can be prepared by the oxidation of pseudocumene (1,2,4-trimethylbenzene) with chromic acid, potassium permanganate, nitric acid or a source of molecular oxygen (e.g. air or oxygen gas). Nitric acid oxidation and molecular oxygen oxidations in acetic acid reaction medium or combinations thereof make use of catalysis provided by metals of variable valence (e.g. cobalt, manganese and cerium). Chromic acid oxidation is conducted in an acidic medium such as acetic acid. Permanganate oxidation is conducted in an alkaline aqueous reaction medium and produces salts of trimellitic acid. Nitric acid oxidation can be conducted in an aqueous medium for example by the use of dilute nitric acid at elevated temperature and pressure.

Pseudocumene oxidation with molecular oxygen in the presence of acetic acid reaction medium and a metal oxidation catalyst (e.g. cobalt, manganese and cerium) at temperatures from 100–235° C. using a side chain oxidation initiator or promotor such as acetaldehyde, a methyl ketone (e.g. methylethylketone) or an ionic or covalent source of bromine, or mixtures thereof. At low temperatures, for example between 100 and 160° C., oxygen gas and air result in incomplete oxidation of pseudocumene under liquid phase conditions in the presence of catalysis provided by the combination of the metals and side chain initiators in acetic acid and the resulting methyl phthalic acids and dimethyl benzoic acids are further oxidized with nitric acid to trimellitic acid. Air oxidation of pseudocumene with air and oxygen gas under liquid phase condition at temperatures above 160° C. up to 235° C. and pressures above 50 and up to 300 p.s.i.g. (pounds per square inch gauge pressure) in the presence of acetic acid and catalysis provided by cobalt, manganese, cerium and combinations thereof with a source of bromine does, within commercially feasible reaction time, produce substantial conversion of pseudocumene to high yields of trimellitic acid with low amounts of such intermediate products as methylphthalic acids and no dimethylbenzoic acid. Such oxidation produces as intermediate oxidation products the methylphthalic acids and formylphthalic acids and complex by-products all in low amounts from substantially pure pseudocumene. When commercial $C_9$ aromatic hydrocarbons containing 90–98% pseudocumene and small amounts of mesitylene, xylene isomers and ethyl toluenes are oxidized by said efficient catalytic liquid phase oxidation, there are also produced as co-products small amounts of trimesic acid and isomeric phthalic acids. Hereafter "co- and by-product impurities will be used to collectively refer to the above oxidation intermediates, complex by-products and co-produced trimesic acid and phthalic acids unless otherwise identified.

Many routes have been proposed for the recovery of TMA (trimellitic acid anhydride) product from the fluid oxidation effluent from liquid phase oxidation of pseudocumene. While these routes have been described as applied to the effluent from the catalytic liquid phase oxidation of pseudocumene with air in the presence of acetic acid and catalysis provided by the combination of oxidation metals and source of bromine, those routes are applicable to the aforementioned nitric acid oxidation and two step combination of air oxidation at low temperature followed by nitric acid oxidation in the same acetic acid reaction medium. For the most part, the effluent containing trimellitic acid is cooled to crystallize trimellitic acid which is recovered in crude form by solid-liquid separation leaving 30–40% of the tricarboxylic acid dissolved, or by evaporation or distillation of the reaction medium to recover crude trimellitic acid. Such recoveries of crude trimellitic acid are taught in U.S. Pat. No. 2,971,011 which further teaches thermal dehydration of the crude tricarboxylic acid to crude TMA, selective extraction of TMA from the crude product, color adsorbent treatment of the extract solution followed by recovery of TMA from the decolorized solution by crystallization or evaporation or distillation of extract solvent.

U.S. Pat. No. 3,161,658 teaches treating such acetic acid mother liquors containing dissolved trimellitic acid to recover 65–67% of the solute as crude acid anhydride. This is done by charging the acetic acid mother liquor into a melt of trimellitic acid anhydride to drive off the solvent. A portion of the crude acid anhydride is withdrawn and selectively extracted with a methyl ketone or aromatic hydrocarbon solvent, separating the solution from insolubles and removing the solvent by evaporation or distillation. The partially purified acid anhydride is combined with crystallized trimellitic acid recovered from cooling reaction effluent, preferably after conversion of the tricarboxylic acid to its acid anhydride and the total crude acid anhydride is fractionated.

United States Pat. No. 3,261,846 takes another approach to increasing recovery of trimellitic acid anhydride from its tricarboxylic acid in the oxidation effluent.

Such effluent is combined with 0.2 to 10 parts pseudocumene per part on weight basis of total solids in the oxidation effluent and the mixture is distilled in the presence of a strong mineral acid to remove an azeotropic mixture comprising an aqueous phase and pseudocumene phase and a concentrated (95–100%) acetic acid fraction. Crude trimellitic acid can now be recovered, dehydrated and fractionated. With an excess of pseudocumene over that required to remove the water, distillation at a higher temperature in the presence of more strong mineral acid can be conducted to convert trimellitic acid to its acid anhydride. The residue is filtered hot to remove insolubles, the hot filtrate, which is a solution of the acid anhydride, is recovered. Partially purified acid anhydride is crystallized at 25° C., recovered, washed with pentane, melted and fractionated to recover acid anhydride product. Washing with pentane or other aliphatic hydrocarbon is necessary to remove pseudocumene because it otherwise distills with fractionated product.

The latter two prior recovery techniques require a final fractionation to obtain desired acid anhydride product free from contaminants. The first prior technique leaves some metal contaminants in the final acid anhydride product and makes use of decolorizing adsorbent. There are other processing drawbacks in those prior acid anhydride techniques which are readily apparent to those skilled in this art.

The present inventive process eliminates crystallization of trimellitic acid from the fluid oxidation effluent, use of selective solvent and color absorbents and vacuum fractionation, does not carry forward metal compounds as contaminents and does by a commercially feasible recovery process provide acceptable TMA product.

SUMMARY OF INVENTION

Fluid effluent from the oxidation of pseudocumene to trimellitic acid under liquid phase conditions at a temperature above 160° C. and pressure above 50 p.s.i.g. in an aqueous or acetic acid reaction medium or a fluid concentrate of said effluent is simultaneously stripped of reaction medium and trimellitic acid is converted to its acid anhydride (TMA) as crude product at a pressure in the range of 0–20 p.s.i.g. (i.e. atmospheric pressure to 20 pounds per square inch above atmospheric pressure), this crude TMA with a small amount of strong mineral acid are heated at reduced pressure to obtain TMA product vapors by vacuum evaporation or distillation and TMA product is recovered as condensate. Such recovered TMA product amounts to 98% of trimellitic acid equivalent produced by pseudocumene oxidation.

Such TMA recovery process differs from the prior TMA recovery processes as before indicated by eliminating crystallization of crude trimellitic acid from the oxidation effluent or use of solvent to selectively extract TMA and treat extract solution with color adsorbent followed by crystallization of TMA product from decolorized extract solution. It also differs from the TMA product recovery of U.S. Pat. No. 3,261,846 which uses strong mineral acid during azeotropic distillation with aromatic hydrocarbon to remove water and acetic acid from oxidation effluent, additional strong mineral acid during conversion of trimellitic acid to crude TMA, filtration and vacuum distillation to recover only a heartcut fraction as TMA product amounting to about 92% of equivalent trimellitic acid produced by pseudocumene oxidation.

DESCRIPTION OF DRAWING

The accompanying drawing is a schematic illustration of one embodiment of the practice of the present invention wherein the fluid oxidation effluent contains trimellitic acid, co- and by-product as well as metal compounds as impurities and acetic acid reaction medium having a water content of 5 to 20 weight percent based on the total reaction medium (i.e. acetic acid plus water).

Such fluid oxidation effluent at elevated temperature above 160° C. and pressure above 50 p.s.i.g. is transferred from its source via transfer line 10 and charged into fluid contents of flash drum 11 operated at a slight positive pressure of about 20–70 p.s.i.g. to avoid using a pump in transfer line 10. By pressure reduction to 20–70 p.s.i.g. and sensible heat of the effluent, vapors of acetic acid and water evaporate from the surface of the fluid in flash drum 11. Said vapors are removed therefrom without condensation and pumping of condensate via vapor transfer line 12 and charged to the lower portion of solvent stripper 14 wherein water and acetic acid are removed as overhead fraction via vapor transfer line 15 with additional vapors of acetic acid and water from a source later described entering the lower portion of solvent stripper 14 as shown via line 19. Solvent stripper 14 can be conveniently operated at a top pressure of 8–12 p.s.i.g.

Additional reaction medium can be evaporated in flash drum 11 by providing heat from external source in known manner for example to the effluent charged thereto by a heat exchanger, by a coil or heating jacket on flash drum 11 (all not shown). Residual effluent concentrate flows from flash drum 11 via concentrate transfer line 13 as feed to trimellitic acid primary dehydrator 17 containing a pool of crude molten TMA as feed to trimellitic acid primary dehydrator 17 containing a pool of crude molten TMA at a temperature of 200–250° C. at a pressure of 9–11 p.s.i.g. when solvent stripper 14 is operated at a top pressure of 8–12 p.s.i.g. Such pool can amount suitably to 1–3 weight equivalents of crude TMA in the effluent concentrate feed but the precise amount is not critical. Said pool is maintained as a melt at 200–250° C. by supply of external heat as shown. Such heating can be by internal coil, or a heat exchanger, or external jacket. Primary dehydrator 17 has an integral part thereof reflux condenser 18 cooled as shown to condense TMA vapors at a temperature of 170–180° C. and return TMA condensate as reflux to the pool. When the effluent concentrate has an appreciable solvent content it may be desirable to omit reflux condenser 18 and transfer all the generated vapor via transfer line 19 to solvent stripper 14. Essentially all of the acetic acid and water of the reaction medium and a substantial portion of the water of dehydration of trimellitic acid to TMA (about 92–95% trimellitic acid is dehydrated) passes through reflux condenser 18 and is transferred via vapor transfer line 19 to the upper portion of solvent stripper 14 wherein materials boiling above acetic acid but below TMA and not condensed by reflux condenser 18 are withdrawn from the bottom of solvent stripper 14 via recycle line 16 and are also returned to the pool in primary dehydrator 17.

An amount of the pool of crude TMA, equivalent to the crude TMA content in the oxidation effluent and trimellitic acid not converted, is withdrawn from primary dehydrator 17 via suction line 20 by pump 21 and discharged into line 22 as feed to secondary dehydrator 23 operated at 200–250° C. and atmospheric pressure to complete dehydration of remaining 5 to 8% trimellitic acid to TMA. Secondary dehydrator 23 also has a reflux condenser 25 as an integral part. Said reflux condenser is also operated at 170–180° C. to condense TMA vapors as liquid condensate and return same as reflux to fluid contents of secondary dehydrator 23. Water vapor and some impurity materials boiling below TMA not condensed by reflux condenser 24 are discharged through vent line 25 and separately processed to dispose of said impurities, for example by charging said mixture of vapors to an incinerator (not shown).

Crude TMA is withdrawn from secondary dehydrator via transfer line 26 in an amount equivalent to crude TMA charge less water and impurities vented and a small amount of strong mineral acid is taken from its source through suction line 27 by pump 28 discharging via acid transfer line 29 into transfer line 26 to mix with crude TMA therein as feed to scraped surface evaporator 30 or any other means for rapid evaporation of TMA such as a falling film evaporator. Such evaporator is operated under vacuum from a source thereof for example as shown, imposed through vacuum line 35 on TMA distillate receiver 33, condenser 34 and vapor transfer line 32. The reduced pressure in such rapid evaporator can be suitably 5 to 50 mm. Hg absolute and the temperature of the heated evaporator surface can be suitably about 50–80° above the boiling point of the TMA at such pressure, for example such temperatures as 275–350° C. It has been reported that at such temperatures the double anhydride of TMA (intramolecular anhydride between two moles of TMA) forms in 2–30 hours. The TMA residence time in such a rapid TMA evaporator is too short, i.e. 0.6 to 15 seconds, for double anhydride formation.

Returning to scraped surface evaporator 30 shown in the drawing, its feed mixture of crude TMA and small amount of strong mineral acid flows downwardly on the heated scraped surface from which TMA and residual impurities boiling below TMA (note not vented via vent line 25) evaporate at the reduced pressure of operation. The resulting vaporous mixture leaves said vacuum evaporator 30 via vapor transfer line 32 and enter condenser 34 cooled as shown to operate at a temperature of 170 to 180° C. to condense TMA as a liquid which flows into condensate receiver 33 and permit vapors of such lower boiling materials to be withdrawn via vacuum line 35. The condensate in receiver 33 is removed through valved product line 36 as recovered TMA product. The recovered TMA product amounts to 97–98% of the equivalent trimellitic acid in the original oxidation effluent. Materials boiling above TMA are withdrawn from evaporator 30 via residue discharge 31 as a viscous dark colored fluid mass and contain metallic impurities.

TMA condenser 34 and condensate receiver 33 are shown as a single apparatus. But both can be separate apparatus items with suitable condensate flow connections between them.

The mixture of vapors of water and acetic acid transferred via vapor transfer line 15 from acetic acid solvent stripper 14 enter the lower portion of acetic acid fractionator 40 from which an aqueous fraction (0.3 to 0.5% acetic acid) is withdrawn via vapor vent line 41 to water or air cooled condenser 42 to condense the aqueous overhead fraction and water condensate is collected in receiver 43 for discard via discharge line 44. Concentrated (95–98%) acetic acid is withdrawn as liquid bottom fraction from fractionator 40 via solvent transfer line 45 for recycle as reaction medium for pseudocumene oxidation.

EMBODIMENTS OF THE INVENTION

As previously disclosed the oxidation effluent contains trimellitic acid, co- and by-product and metal impurities when metal catalysts are used, and aqueous or acetic acid reaction medium. When the reaction medium is aqueous, such as from chromic acid or nitric acid oxidation of pseudocumene, it is preferred to remove substantially all the aqueous medium by evaporation or distillation to provide a pumpable slurry of solids or a melt of solids content of the oxidation effluent as feed to the primary dehydration step. This is done so that the crude TMA withdrawn from the primary dehydration step contains 90–95% trimellitic acid as TMA otherwise trimellitic acid dehydration efficiency would be decreased and an excessive part of the crude TMA melt in the primary dehydration step would be hydrolyzed back to tricarboxylic acid.

When the oxidation effluent has an acetic acid reaction medium with water content of 3–5% by weight based on total solvent (acetic acid plus water) a secondary dehydration step is not essential. Such oxidation effluent can be added directly to the dehydration step and flash drum 11 can be omitted. Such effluent added directly to the crude TMA melt results in evaporation of all acetic acid reaction medium and dehydration of trimellitic acid to TMA in 1–3 hours time. In this case the portion of the crude TMA withdrawn therefrom can flow as by pumping through a surge feed tank maintained at atmospheric pressure and the dehydration bottom temperature, i.e. 200–250° C. and preferably 240–250° C. and vented through a zone cooled to 170–180° C. to provide venting of some materials boiling below TMA. Crude liquid TMA can flow therefrom to be mixed with the small amount of strong mineral acid.

In the primary dehydration step, or single step as above described, there is suitably maintained therein a melt of crude TMA in an amount at least equal to that equivalent to the dehydrated total solids of the reaction effluent. For continuous operation this will provide at least one hour residence time for evaporation of solvent and trimellitic acid dehydration with a crude TMA melt at about 240–250° C. It is advantageous to maintain in the single dehydration step or primary dehydration step an amount of crude TMA 2–3 times said equivalent of total solids in the oxidation effluent to provide a longer residence time therein, e.g. 2–3 hours, to provide complete trimellitic dehydration to TMA in the single step or 95–97% dehydration in the primary dehydration step. To complete the dehydration to TMA in the second dehydration step when used, a residence time of crude TMA feed charged thereto of up to one hour will be satisfactory at temperature of 230–250° C. The end result of the dehydration step(s) is, of course, to have a crude TMA with substantially no trimellitic acid as feed for vacuum evaporation or distillation of TMA product therefrom.

The vacuum evaporation or distillation of TMA and impurities boiling below TMA is conducted suitably at an absolute pressure of 5–50 mm. Hg at short TMA residence time and a maximum temperature of 50–80° C. above TMA boiling point at operating temperature, i.e. 275–350° C. to avoid formation of TMA double anhydride. A TMA residence time in the range of suitably 0.1 second to 30 minutes, desirably 0.1 second to 10 minutes and desirably 0.1 second to 5 minutes at 25–350° C. will be sufficiently short to avoid formation of said double anhydride. The foregoing operating temperatures are those of the evaporating surface in contact with crude TMA as in scraped or wiped surface evaporators or falling film evaporators and the bottom or pot temperature for distillation. The use of vacuum evaporation is preferred because, by the use of strong mineral acid, the ultimate residue is fluid even though it contains a rather small amount, 2–3% of the TMA content in the feed. The use of a strong mineral acid ties up metals of metal impurities, reduces residue viscosity and improves heat transfer properties. Without the use of strong mineral acid; for example, at final pot temperature of 310° C. and 6 mm. Hg vacuum distillation, the residue starts to decompose at 310° C. (pressure increases to 10 mm. Hg by decomposition) the residue contains 14–15% of TMA charged and is a rather viscous, bubbling, dark colored adherent mass.

It is preferred that the strong mineral acid have two or more equivalents of hydrogen per mole and of these phosphoric acids and sulfuric acid are preferred because the metals of the metal compound impurities are bi- and higher in equivalency, for example di- and trivalent cobalt, manganese, cerium and chromium from catalyst or oxidizing agent and nickel, iron, chromium, etc, from corrosion of metal apparatus. The amount of such strong mineral acid employed is suitably 1–3 and preferably 1–2 equivalents per gram atom equivalent of metal present in crude TMA. Such amount of strong mineral acid is less than that used before in the removal of reaction medium, dehydration of trimellitic acid and fractionation of crude TMA used in the practice of TMA recovery according to U.S. Pat. No. 3,261,846. According to that patent 4 ml. of sulfuric acid was used for a total of 293.6 grams total solids from oxidation effluent and mother liquor. This represents, on the basis of 100% sulfuric acid, 1.38 ml. sulfuric acid per 100 grams total solids.

For comparison of the different amounts of strong mineral acid to be used by this inventive process and the above prior process there will be used the total solids from oxidation effluent which contains for each 100 weight parts acetic acid reaction medium, 36.3 parts trimellitic acid, 1.18 parts co- and by-product impurities and 0.12 part metal compounds (essentially Co and Mn compounds) on a weight basis. Evaporation of an amount of such effluent containing 1000 grams of acetic acid reaction medium would provide 376 grams of total solids having 1.2 grams metal compounds. According to the prior art process there would be used 4.18 ml., 100% sulfuric acid. However, for said 1.2 grams metal compounds as Co or Mn acetates or trimellitates present as equal gram atoms of metals there would be required for the metal acetates 0.38 ml. and for the metal trimellitate 0.25 ml. of 100% sulfuric acid per total equivalent of metal. On the basis of the same amount of total solids the prior art use of 100% sulfuric acid is 16.7 to 11 fold greater than said respective amount for acetates and trimellitates.

According to the present invention the strong mineral acid is used in an amount of from 1–3, preferably 2, equivalents per equivalent of total metal in the total solids. Even the 2–3 equivalents of strong mineral acid are materially below the prior art usage. Also the strong mineral acid use in the present inventive process is for a different purpose: to fluidize residue, resulting in greater 97–98% TMA against 92% TMA recovery. Other advantageous use of strong mineral acid in the vacuum evaporation or distillation is the 97–98% TMA recovery against 85–86% TMA recovery before indicated when not used in this step.

The present inventive process is illustrated by the following examples.

Example 1

The oxidation liquid effluent used is that obtained by the oxidation of $C_9$ aromatic feedstock containing 98% pseudocumene with air in the presence of 9% acetic acid (3% water) reaction medium containing 0.23 weight percent total of cobalt and manganese (calculated as the metals but charged as their acetate tetrahydrates) and a bromine source to provide 0.3 weight percent bromide ion. The effluent contains as acetic acid medium 85.5% acetic acid and 14.5% water by weight. For each 100 parts of said acetic acid medium there are present 36.3 parts trimellitic acid, 1.18 parts co- and by-product impurities and 0.12 part metal compounds on a parts by weight basis. The liquid effluent temperature is 205° C. at a pressure of 325 pounds per square inch.

This liquid effluent is processed by the process flow illustrated by the accompanying drawing at the rate of 1376 pounds per hour (i.e. 1000 pounds 85.5% acetic acid medium and 376 pounds total solids). The effluent is depressurized to atmospheric pressure in flash drum 11 and the concentrate therefrom flows to primary dehydrator 17 containing 690 pounds crude TMA, twice the crude TMA equivalent in the effluent, at atmospheric pressure and a temperature of 240° C. and whose reflux condenser is operated at 180° C. About 92% of the trimellitic acid is converted to TMA. There is withdrawn from the primary dehydrator 347 pounds crude TMA containing 29 pounds trimellitic acid as feed for the secondary dehydrator operated at atmospheric pressure and a temperature of 250° C. with its condenser operated at a temperature of 175° C. The residence time in the primary dehydrator is 120 minutes an in the secondary dehydrator is 60 minutes. There is withdrawn from the secondary dehydrator crude TMA in an amount of 343 pounds per hour (2 pounds of impurity boiling below TMA vented with water of dehydration) containing 332 pounds TMA, 9.8 pounds co- and by-product impurities and 1.2 pounds metal compounds. To this crude TMA effluent in feed line 26 there is added 1.05 pounds 100% sulfuric acid per hour which is 2 equivalents of acid per equivalent of metal on basis of one-third acetate and two-thirds trimellitate. This mixture of crude TMA and sulfuric acid is charged at the rate of 344 pounds per hour into scraped surface vacuum evaporator 30 operated at 6 mm. Hg absolute pressure and whose heating surface is at a temperature of 300° C. The residence time in the vacuum operator is 5 minutes. The overhead TMA fraction from the vacuum evaporator is condensed at 180° C. and the condensate is collected and withdrawn for cooling to form a flaked product. The condensate contains 98% of the TMA charged to the evaporator and the remaining 2% is in the residue therefrom. The condensate is 97% TMA.

Example 2

The oxidation effluent used is obtained in a manner similar to that used in Example 1 but its solvent medium is 95% acetic acid and 5% water. It also contains for each 100 parts of acetic acid solvent 36.6 parts trimellitic acid, 1.18 parts of co- and by-product impurities and 0.12 part metal compounds. 1376 pounds per hour of this effluent (363 pounds trimellitic acid, 11.8 pounds impurities and 1.2 pounds metal compounds) are charged directly to primary dehydrator 17 containing 690 pounds crude TMA at 250° C. and atmospheric pressure. There is withdrawn from primary dehydrator 17 a crude TMA liquid in the amount of 347 pounds per hour having no trimellitic acid and pumped into line 26 and there combined with 1.05 pounds 100% sulfuric acid to provide feed to vacuum evaporator 30. The remainder of the crude TMA processing is the same as in Example 1.

The TMA product condensate collected is 97% TMA and contains 98% of the TMA charged to the vacuum evaporator.

In the foregoing examples 100% phosphoric acid in an amount equivalent to the 100% sulfuric acid can be substituted and the condensate TMA product will contain 97% TMA and 98% of the TMA charged to the vacuum evaporator. The strong mineral acid need not be of 100% but rather can be 90–100% by weight in strength. Lower concentrations (i.e. above 10 weight percent water concentration) can be used provided residence time in vacuum evaporation is longer to permit redehydration of any TMA hydrolyzed upon mixing crude TMA with such more dilute acid.

What is claimed is:

1. The recovery of trimellitic acid anhydride product of at least 97% anhydride content from fluid effluent from oxidation of pseudocumene in the liquid phase to trimellitic acid in an oxidation medium which is acetic acid solution containing cobalt, manganese and source of bromine, which process consists essentially of: dehydrating the total solids content of said effluent at a pressure in the range of atmospheric pressure to 20 p.s.i.g. in molten crude trimellitic acid anhydride at a temperature in the range of 200 to 250° C. to a crude acid anhydride containing co- and by-product impurities and metal compounds, combining said crude acid anhydride product with sulfuric or phosphoric acid in an amount equal to 1–3 equivalents therefor for each equivalent of metal, subjecting the resulting mixture of said mineral acid and crude acid anhydride to vacuum evaporation or distillation at an absolute pressure of 5–100 mm. Hg and maximum temperature of 275–350° C. for rapid vaporization of trimellitic acid anhydride and materials boiling below said anhydride in a residence time of 0.6–15 seconds, and condensing the generated vapors at a temperature of 170–180° C. to selectively condense trimellitic acid anhydride product of at least 97% acid anhydride content.

2. The process of claim 1 wherein the rapid evaporation of acid anhydride is accomplished on a heated scraped surface or as a thin film falling on a heated surface.

3. The process of claim 2 wherein the oxidation effluent contains above 5% and up to 15% water and is at a temperature in the range of 160–235° C. and a pressure above atmospheric pressure, the effluent is first flashed to atmospheric pressure to produce a concentrate, the concentrate is charged to a first dehydration zone to convert 92% of the trimellitic acid to crude acid anhydride and then charged to a second dehydration zone to complete the dehydration to acid anhydride.

4. The process of claim 2 wherein the oxidation effluent contains acetic acid solvent with 3 to 5% water by weight and is at a temperature of 160–235° C. and elevated pressure to maintain the acetic acid solvent in the liquid phase, this fluid effluent is charged to a single dehydration zone operated at atmospheric pressure and 240–250° C. and the resulting crude trimellitic anhydride product is charged to the vacuum evaporation step.

References Cited
UNITED STATES PATENTS 3,261,846   7/1966   Meyer _____ 260—346.4

DONALD G. DAUS, Primary Examiner

B. DENTZ, Assistant Examiner

U.S. Cl. X.R.

260—346.3

UNITED STATES PATENT OFFICE
CERTIFICATE OF CORRECTION

Patent No. 3,798,238    Dated March 19, 1974

Inventor(s) Delbert H. Meyer

It is certified that error appears in the above-identified patent and that said Letters Patent are hereby corrected as shown below:

Column 6, Line 38 - 25- should be 275-
Column 7, Line 40 - 9% acetic acid should be 97% acetic acid
Column 7, Line 68 - an should be and Signed and sealed this 12th day of November 1974.

(SEAL)
Attest:

McCOY M. GIBSON JR.
Attesting Officer

C. MARSHALL DANN
Commissioner of Patents